United States Patent
Zou et al.

(10) Patent No.: US 9,103,555 B2
(45) Date of Patent: Aug. 11, 2015

(54) MULTIPLE ZONE CLIMATE CONTROL SYSTEM

(76) Inventors: Shazhou Zou, Columbia, MD (US); Victor W Wang, Fairfax, VA (US); Jian Mao, Changsha (CN); Tianxin Wang, Boyds, MD (US)

(*) Notice: Subject to any disclaimer, the term of this patent is extended or adjusted under 35 U.S.C. 154(b) by 1078 days.

(21) Appl. No.: 12/925,041

(22) Filed: Oct. 12, 2010

(65) Prior Publication Data

US 2011/0031322 A1 Feb. 10, 2011

Related U.S. Application Data

(63) Continuation-in-part of application No. 10/702,241, filed on Nov. 6, 2003, now Pat. No. 7,832,465.

(60) Provisional application No. 61/278,890, filed on Oct. 14, 2009.

(51) Int. Cl.
*F24F 3/00* (2006.01)
*F24F 3/044* (2006.01)
*F24F 11/00* (2006.01)

(52) U.S. Cl.
CPC ........... *F24F 3/0442* (2013.01); *F24F 11/0076* (2013.01); *F24F 11/0086* (2013.01); *F24F 2011/0067* (2013.01); *F24F 2011/0068* (2013.01); *Y02B 30/767* (2013.01)

(58) Field of Classification Search
CPC . F24F 3/0422; F24F 11/0076; F24F 11/0086; F24F 2011/0067; F24F 2011/0068; Y02B 30/767
USPC .................. 165/205, 207, 208, 209, 212, 218; 236/49.3; 454/229; 700/11, 17, 19, 700/276, 277, 278; 704/274, 275, 276; 702/130
See application file for complete search history.

(56) References Cited

U.S. PATENT DOCUMENTS

| | | | |
|---|---|---|---|
| 4,530,395 A | 7/1985 | Parker et al. | |
| 4,646,964 A | 3/1987 | Parker et al. | |
| 4,809,593 A | 3/1989 | Asselbergs et al. | |
| 4,931,948 A | 6/1990 | Parker et al. | |
| 5,271,558 A | 12/1993 | Hampton et al. | |
| 5,341,988 A * | 8/1994 | Rein et al. | 236/49.3 |
| 5,361,985 A * | 11/1994 | Rein et al. | 236/49.3 |
| 5,364,304 A * | 11/1994 | Hampton | 236/49.3 |
| 5,385,297 A * | 1/1995 | Rein et al. | 236/49.3 |
| 5,390,206 A * | 2/1995 | Rein et al. | 236/49.3 |
| 5,481,481 A * | 1/1996 | Frey et al. | 700/276 |
| 5,810,245 A * | 9/1998 | Heitman et al. | 236/49.3 |
| 5,833,134 A | 11/1998 | Ho et al. | |
| 5,839,654 A * | 11/1998 | Weber | 236/47 |
| 6,029,092 A * | 2/2000 | Stein | 700/11 |
| 6,192,282 B1 * | 2/2001 | Smith et al. | 700/19 |
| 6,229,433 B1 * | 5/2001 | Rye et al. | 340/12.5 |
| 6,405,103 B1 * | 6/2002 | Ryan et al. | 700/19 |
| 6,692,349 B1 * | 2/2004 | Brinkerhoff et al. | 454/256 |
| 6,838,978 B2 * | 1/2005 | Aizu et al. | 700/17 |
| 6,967,565 B2 * | 11/2005 | Lingemann | 700/19 |
| 7,156,316 B2 * | 1/2007 | Kates | 165/208 |
| 7,163,156 B2 * | 1/2007 | Kates | 165/208 |
| 7,168,627 B2 * | 1/2007 | Kates | 236/49.3 |
| 7,383,148 B2 * | 6/2008 | Ahmed | 702/130 |

(Continued)

*Primary Examiner* — Ljiljana Ciric

(57) ABSTRACT

A multiple zone climate control system includes a HVAC unit, a digital wireless network, powered wireless adjustable registers controlled by their respective zone controllers, and a central controller that controls the HVAC unit and coordinates the zone controllers for concerted action.

10 Claims, 12 Drawing Sheets

(56) References Cited

U.S. PATENT DOCUMENTS

| | | | |
|---|---|---|---|
| 2001/0041982 A1* | 11/2001 | Kawasaki et al. | 704/275 |
| 2002/0171379 A1* | 11/2002 | Adamson | 315/312 |
| 2003/0011467 A1* | 1/2003 | Suomela | 340/7.1 |
| 2003/0050737 A1* | 3/2003 | Osann, Jr. | 700/276 |
| 2004/0067731 A1* | 4/2004 | Brinkerhoff et al. | 454/325 |
| 2004/0095237 A1* | 5/2004 | Chen et al. | 340/506 |
| 2004/0175078 A1* | 9/2004 | Imamura | 385/88 |
| 2004/0260407 A1* | 12/2004 | Wimsatt | 700/19 |

* cited by examiner

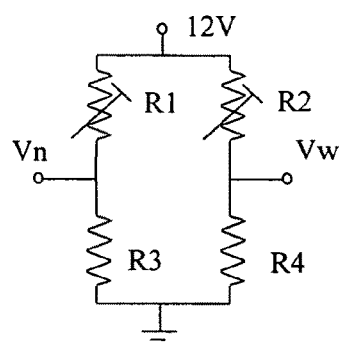
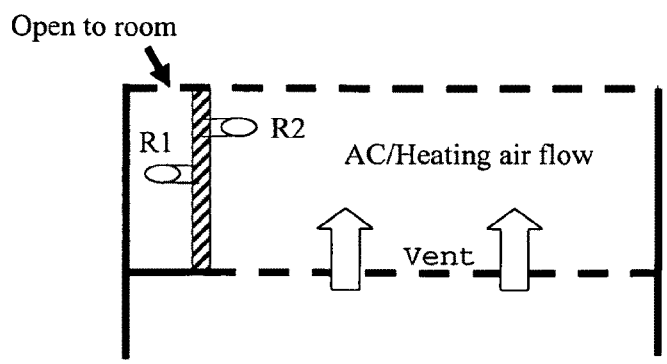
FIG. 15a
FIG. 15b
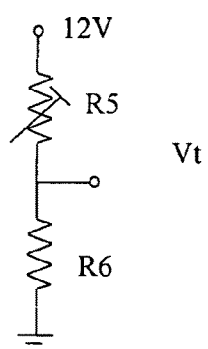
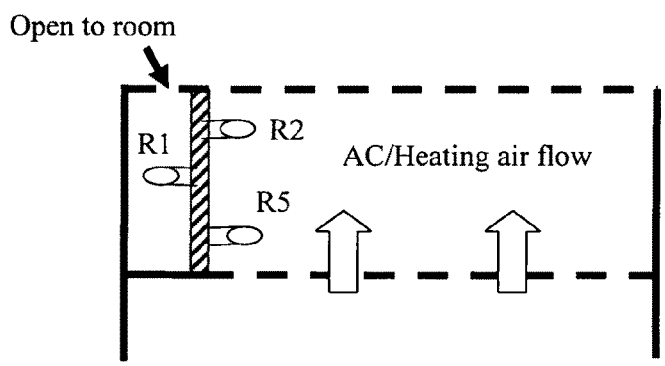
FIG. 16a
FIG. 16b

MULTIPLE ZONE CLIMATE CONTROL SYSTEM

CROSS-REFERENCE TO RELATED APPLICATIONS

This is a Continuation-In-Part application of U.S. application Ser. No. 10/702,241, filed Nov. 6, 2003, now U.S. Pat. No. 7,832,465 the disclosures of which are incorporated herein by reference in their entirety. It also claims priority to U.S. Provisional Application No. 61/278,890, filed on Oct. 14, 2009, which provisional application is hereby incorporated by reference in its entirety. The entire disclosure of the prior application is considered to be part of the disclosure of the instant application and is hereby incorporated by reference.

BACKGROUND OF THE INVENTION

1. Field of the Invention

This invention relates to a duct type air conditioning system (AC system), which is capable of energy efficiently regulating temperature in each room (or zone) independently as well as providing other air conditioning functions such as ventilation, humidifying, cleaning and filtering air in each room independently.

2. Background Information

In most residential houses, one or more central HVACs (heating, ventilation and air-conditioning) are used to send conditioned air to designated rooms. Usually, one thermostat controls the temperature of several rooms or zones. Due to differences in ventilation efficiency and exterior thermal load among different zones, not all zones can achieve the temperature set at the single thermostat control. It is common that rooms on the upper floor have much higher temperature in the summer than rooms in lower floor. In winter, rooms in northwest corner or above the garage of a house usually have lower temperatures than other rooms. With a single thermostat, occupants in different zones cannot select their own comfort level. Moreover, for a zone where the thermostat is not located to reach a certain level, all other zones have to rise or fall at the same time. This is a great waste of energy. Therefore, it is highly desirable that the temperature and possibly other air comfort and quality measures in each zone can be controlled individually.

These solutions, however, are usually complex and expensive and thus hard to justify from cost saving point of view. For example, the solutions by Parker et al. (U.S. Pat. Nos. 4,530,395, 4,646,964, 4,931,948) require dampers fitted inside ducts, thus incurring high installation and maintenance costs. Ho et al. (U.S. Pat. No. 5,833,134) use dampers in registers to control airflows, but the design calls for the register dampers to be manually controlled, thus barring the possibility of automatic zone temperature control. Hampton et al. (U.S. Pat. No. 5,271,558) require turbines be placed in the register and the turbines be connected to power generators. Their invention does not have coordination among zone thermostats either. The current invention presents a simple and inexpensive individual-zone controlled HVAC system.

SUMMARY OF THE INVENTION

The duct type forced air central HVAC system normally contains the ducts connecting each room to deliver conditioned air, a thermostat and a HVAC unit. The HVAC unit normally contains a heating/cooling unit and a central fan or fans that blow air through the heating/cooling unit to produce cooled/heated air. The HVAC unit normally contains an in house part and an outside part for heat exchange.

One aspect of the current invention provides a system capable of regulating temperature (and/or humidity, air quality, etc.) in each zone independently, which can be incorporated into a new AC system as well as be added on to an existing AC system with low cost and easy installation. The system comprises a HVAC unit that supplies conditioned air; a central controller (central control unit) that controls the HVAC unit and coordinates with the control unit in each zone; zone controller (zone control unit) in every zone requiring air conditioning to control the zone air flow rate regulating devices, which could be dampers, air blowers (boosters) or the combination of dampers and boosters, and send zone data to central controller; air flow rate regulating devices such as battery powered dampers on registers (with and without an air blower that may require additional power) and/or air blowers in each zone requiring air conditioning to regulate the flow rate of conditioned air; and use of intelligent digital wireless communication network (e.g. using IR or RF signal) to connect all components of the system listed above. This system avoids the need of extensive wiring and large-scale modification on the existing ductwork of a building to realize independent zone climate control. The air purification unit can also be integrated with the airflow rate regulating devices. It is preferred that the zone controller and the zone register be installed in majority of or all the rooms. A zone can be one room or multiple rooms based on the user's need.

Central control unit has multiple functions. It controls the HVAC unit and optionally coordinates the zone control units; it may also function as a zone controller that controls the airflow rate regulating devices in the zone where the central controller is located. After the zones have reached the preset conditions, the central controller changes the status of the HVAC unit such as stopping the HVAC unit from cooling or heating. However, it is not always necessary to have a central controller to have zone controller functionality and a separate zone controller can be used to control the zone where the central controller is located.

The central control unit controls whether the system is in a heating, cooling or ventilation state or off state. It can either turn on the cooling/heating of the HVAC unit or stop the HVAC unit from cooling/heating or optionally adjust the cooling/heating performance to produce more or less cooling/heating. The room (zone) controller detects the state (e.g. room temperature) in the corresponding room and act accordingly. For example, considering a situation where a room control unit sets the room temperature to be 70° F. and the actual room temperature is 65° F.; if the central control unit sets the state of the HVAC unit as cooling therefore the HVAC unit is producing cool air and delivering it to the duct, the room control unit will send command to the air regulating device to close the dampers and/or stop the boosters, so the cooling air from the duct will not enter the room or enter less; if the actual room temperature is 75° F., the room control unit will open the dampers and/or start the boosters, so the cooling air from the duct will enter the room or enter more to reduce the temperature in that room until 70° F. is reached.

On the other hand, assuming the central control unit set the HVAC unit in the heating state; if a room control unit sets the room temperature to be 70° F. and the actual room temperature is 65° F., the room control unit will open the dampers and/or start the boosters to allow the hot air coming in or allow more air coming in; if the actual room temperature is 75° F., the room control unit will close the dampers and/or stop the boosters, so the hot air from the duct will not enter the room or enter less. When the central controller sets the system state to be ventilation, all dampers will usually be kept in an open status.

A mode selection switch or the like can be added to the central control unit. For example, the mode could be either heating or cooling or off; therefore in summer, the mode of the central control unit is set to cooling and in winter the mode of the central control unit is set to heating.

In one example, when the mode is set by the user to be cooling (summer), if the temperature setting in one or more zone is not reached because one or more zone is too hot, the zone controller in this zone/zones will inform the central controller their temperature setting and their room temperature (or simply inform the central controller that this zone's setting is not reached); the central control unit will keep the HVAC unit at active cooling state producing cool air to the duct; the damper in these zones is open and/or the booster fan in these zones is on to allow the cooling air entering these zones; when one of the zone is cool enough therefore reach the temperature setting, the zone controller will send out wireless signal to the register to close the damper and/or turn off the booster; it will also send wireless signal to the central controller to report the setting is meet. When the central controller receives setting meet signal from all the zones or predefined zones, it will stop the HVAC unit from producing cool air. After a period of time, the temperature in these zones will rise again. Once a zone controller detect its zone temperature not meet the setting, it will send signal to the registers in this zone to open the damper/start the booster fan. It will also send data of its current temperature/set temperature or a setting not meet signal to the central controller; therefore the central controller will restart the HVAC unit to produce cool air.

In one embodiment the zone controller control the airflow rate regulating device directly by its own decision (e.g. opening the damper based on the difference between the setting temperature and the real temperature in the zone controller). In another embodiment the zone controller control does not make decision to the airflow rate regulating device for its status, the central controller make the decision and send the decision to the zone controller and then the zone controller send the corresponding command to the airflow rate regulating device to set its status. In the third embodiment, both the zone controller and central controllers can make the decision and the central controller can override the decision of the zone controller if there is a conflict.

In some embodiments, an energy saving mode can also be used, which is in the process of HVAC to cool or heat multi zones, when only a small number of (e.g. one or two) zones do not meet the setting temperature and the rest zones meet the settings, the central controller can turn off the heating/cooling unit and only keep the central fan on, therefore the air from zones that meet the temperature setting will be blown to the zones not meet the setting to cool or heat these zones. This algorithm can be used in the case that the temperature settings from different zones are same or close. For existing residential housing use, this can be a common case.

In another embodiment of energy saving mode, if the zone controller in the zone of the air intake of the HVAC unit senses that the temperature meet the setting while most other zones do not or the temperature in the zone of the air intake is cooler than most other zones in the summer or warmer than other zones in winter, the central controller will turn on the central fan but not the heating/cooling unit therefore these better conditioned air will go to other zones to heat/cool them. For example, many homes have a HVAC installed in the basement and the air intake is also in the basement, in the summer, the basement normally is much cooler than other floors therefore the central fan only can be turned on to utilize the cold air in the basement to cool the other floors.

Similarly if the mode is heating in the winter, each satisfied zone will closes its damper/stops its booster; if all the zones are satisfied, the central controller will turn off the heating of the HVAC unit. Once the temperature drops again, the unsatisfied zone controller will open the damper/start the booster in this zone and inform the central controller; the central controller will then turn on the heating of the HVAC unit.

In the above example, what turn on the HVAC is one unsatisfied zone controller and what turn off the HVAC is all zone need to be satisfied. Different algorithms/logics used by the central controller can also be adopted instead. For example, two unsatisfied zones is required to turn on the HVAC system and 60% zones satisfied or several important zones satisfied will turn off the HVAC unit. More algorithms are described in the later part of the current invention.

In some embodiments, the zone controller will keep the damper open/booster on for an additional period of time even after its setting is met. The central controller can also keep the cooling/heating on for an additional period of time even after all the setting is met; or keep the cooling/heating off for an additional period of time even after the setting not met is detected.

The control units contain microprocessors and can be programmed to deliver sophisticated and concerted functions. For example, the degree of openness of a damper and the speed of the fans in the boosters can be programmed as a function of the speed of temperature change and the difference between the set and actual temperatures in the zone, in order for zones to reach the set temperature simultaneously. Battery can be used to supply power to the central and zone control units. Wireless power source can also be used to power them or used in combination with battery (preferably rechargeable battery).

The status of air flow rate regulating devices (e.g. damper and/or booster) is controlled by the zone control units or the central control unit or both of them to regulate flow rate of conditioned air into each zone. In the simplest case, the damper can just assume two statuses, open and closed; the booster can also have only two states: on and off, if a booster is incorporated into the system. In a more sophisticated case, a damper can assume any status between being complete open and complete closed, and an algorithm in the zone control unit or the central control unit can be programmed to make the degree of openness of a damper to be a function of temperature difference between the actual and set temperature of the zone; the status/performance of the boosters can also be adjusted accordingly. In the most sophisticated case, the central control unit and zone control units work together to control the status of dampers and the status/performance of the boosters in all zones in order to achieve the set conditions in every zone in the most efficient manner. As the control units are programmable, the control algorithm can be set at installation and changed when needed later.

Programming to the central controller can be done manually by the key pad or touch screen on the central controller, or by connecting it to a personal computer through an USB port or the like, in another case, when the computer is connected on internet, the central controller can also be programmed through the internet connection remotely.

As there are usually multiple zones in a building, it is important there is no communication interference between control unit in one zone and airflow rate regulating devices in another. There are many well known methods to address this issue. Various means are available to pair zone control units and their corresponding air flow rate regulating devices (e.g. powered wireless registers). For example, every component can be assigned a unique network address in the wireless network composed of the HVAC unit, the central controller, zone controller and air flow rate regulating devices. A standard network communication protocol can be used to carry messages between the network components without possibility of interference/miscommunication. For example, one means is to pair a zone controller and its zone air flow rate regulating device by registering the air flow rate regulating device to the zone controller through an initial "talk" at time of installation.

In some embodiments, the powered dampers in this invention are built into a register, which is the piece that covers the exit of a duct into a zone. Registers can easily be removed and exchanged without having to tear open the ducts. This feature in combination with the wireless communication feature makes the invention easy to install and maintain. A communication unit on this air flow rate regulating device receives instructions from its zone controller and sends commands to a mechanism that controls the status of the damper utilizing motor or other suitable electro-magnetic device. In some embodiments, communication unit on the air flow rate regulating device receives wireless instructions directly from the central control unit or both the central controller and the zone controller.

The boosters in this invention can also be built into a register, which is the piece that covers the exit of a duct into a zone. Fans are added to the registers. The boosters utilize the fan to boost the airflow rate. This feature in combination with the wireless communication feature makes the invention easy to install and maintain. The registers equipped with boosters can also have dampers on their covers or underneath the fan. A communication unit on the register with booster receives instruction from its zone controller and sends commands to a mechanism that controls the status of the booster (e.g. on/off or speed of the fan). In some cases, it receives instructions directly from the central controller or both the zone controller and central controller. In some embodiments, battery power may not be sufficient for booster. An external AC or DC power source can be used. Wireless power source can also be used to power them or used in combination with battery (preferably rechargeable battery). The zone air flow rate regulating devices and/or zone controllers and/or central control unit can use wireless power system as their power supply such as Nikola Tesla's long-range wireless energy; directional energy transfer such as lasers; induction-based energy transfer systems, and those described in www.witricity.com and etc. The combination of battery and wireless power can also be used. For example, they use rechargeable battery to provide power and when the battery is running low, a remote wireless power supply will charge the battery through a wireless power receiver in the register or control unit (e.g. they will send out a battery low wireless signal to start the wireless power supply for charging).

Battery only can be used to supply power to all electrical components on a damper. Low power consumption circuits and components make it possible for the batteries to last a long time. Moreover, battery level detection function can be built in. The damper battery level can be checked regularly. Many well known methods can be used to check the battery level. If battery level is deemed lower, a signal or sign can be displayed on the zone controller or on the register with damper. An external AC or DC power source can also be used instead of battery. Wireless power source can also be used to power them or used in combination with battery (preferably rechargeable battery) as previously described.

There can be a manual override for the airflow regulating device status on the zone controller or the airflow regulating device. When the manual override is engaged, the zone controller set the airflow-regulating device in a certain status until the override mode is revoked.

If the air purification unit is integrated with the register with booster or damper, they can be made to synchronize with the booster/damper. For example, if the damper is open and/or the booster is on, the air purification unit is turned on automatically; if the damper is close and/or the booster is off, the air purification unit is turned off automatically too.

In some embodiments, instead built into the registers, the airflow rate regulating device is damper or booster fan or combination that can be placed in the duct directly connecting to the target zone or the damper or booster fan or combination built in the duct directly connecting to the target zone.

Closing dampers/registers will usually reduce total airflow volume. Too little airflow may have adverse effect on some type of HVAC unit, such as icing or overheating. A temperature sensor can be placed inside the heating/cooling unit or inside or on the duct wall near the heat exchange component of the central HVAC unit. The sensor can send measured temperature to the central control unit. If freezing or over heating situation is detected, the central control unit could change the heating or cooling operation into ventilation operation or stop the heating/cooling. The sensor can also be connected directly with the heating/cooling unit to control it on/off directly without going through the central controller to do so. Another method to avoid too small airflow volume passing through the heating/cooling unit is to have a bypass in the duct. The bypass will be open to release some air before the air going to the ducts to each rooms if too low airflow is detected or to be resulted therefore although the air going to each room are decreased the air passing the heating/cooling unit will not decrease too much. The open/close of the bypass can be controlled by the temperature sensor or the central controller or simply by a pressure sensor since too low airflow will increase the pressure inside the duct. An example of the bypass is a pressure release valve installed in the duct after the heating/cooling unit. To save energy, the released air can be directed to the major air inlet of the heating/cooling unit.

Too low airflow volume may also result in unacceptable airflow pressure in some type of HVAC unit and the ducts. To ensure the airflow volume is acceptable, a number of means (e.g. algorithms in the central controller) can be employed, including keeping certain registers always open, using booster fans, allowing a certain amount of airflow through the register even when a register is closed, setting zone dead band according to degree of temperature fluctuation in the zone, using a pressure sensor in the HVAC unit or the bypass ducts to prevent too low airflow volume etc. One example is to set a minimal number of the dampers that need to be always open. Another example is allowing the damper to cover only partial duct even in fully closed position. A third example is to allow three status of the damper: fully open, partially open and fully closed (damper fully covers the exit of the duct in its fully close status); algorithms can be applied to dynamically control these dampers to keep certain flow rate while having maximal independent climate control and energy saving effects.

In some embodiments, the performance (power) of the fan in the central HVAC system is adjustable. This fan (central fan) in the central HVAC system blow the air through the heating/cooling unit therefore produces and sends cooled/heated air to the duct connecting to each room. When more damper in the registers are closed, the fan will speed up to increase the air flow speed in those not closed registers therefore keep the total airflow in the HVAC system constant or not decrease too much, when more damper in the registers are open, it will slow down to decrease the air flow in those opened registers therefore keep the total airflow in the HVAC system constant or not vary too much. The speed of the motor of the fan can be made adjustable to adjust the power (performance) of the fan. In some cases, the performance of fan is controlled by the central controller. The central controller can have a wire connected to the fan control to send the command or the communication between them can be wireless, in which case the fan control needs to be coupled with a wireless receiver. The fan can also be controlled by the temperature. If overheat or overcooling of the heating/cooling unit is detected by the temperature sensor in the HVAC unit (e.g. the icing/overheating sensor previously described), the fan will speed up to below enough air passing through the heating/cooling unit to change their temperature to normal.

In some other embodiments, the performance of the heating/cooling unit of the central HVAC system is adjustable. For example it can utilize a variable frequency AC to produce different cooling capacity in the summer. When more dampers in the registers are closed, it will provide less cooling; when more dampers in the registers are open, it will provide more cooling. Therefore the over cooling will not happen. In some cases, the performance of heating/cooling unit is controlled by the central controller. In the winter, when more registers are closed, less gas is provided for burning in the heater of the HVAC if gas is used for heating; or uses less electricity such as using less heating elements or lower voltage if electricity is used for heating in the HVAC. In many variable frequency AC systems, the speed of the motor of the condenser is adjustable therefore the amount of cooling and heating (heat pump) it produced is adjustable. In some embodiments, the speed adjustment is controlled by the central controller. In some other embodiments, it is controlled by the temperature sensor similar to the central fan control mechanism.

The combination of using adjustable fan and adjustable heating/cooling unit can also be used to accommodate the changed airflow volume. The power of the heating/cooling unit will be decreased if the airflow volume passing through heating/cooling unit is decreased therefore avoid the over heating/cooling.

Examples of the invention described above are further illustrated in FIG. 1~12.

For many homes, it is safe to use dampers in the register as the only airflow rate regulating device in the system. However, some homes have ducts poorly constructed, which have too low flow rate even in normal operating condition (single zone). Using dampers only in these homes to achieve multi-zoning may result in unacceptable low flow rate and therefore may cause problems to the central HVAC unit. For these homes, the boosters described above or the combination of boosters and dampers above is can be used as the preferred airflow rate regulating devices. One aspect of the current invention relates to a register type booster system for the duct type air conditioning system, which is capable of regulating airflow rate in each room (or zones) automatically. In some embodiments, the booster system utilizes the previously described central control unit and zone controllers. In other embodiments, the previously described central control unit and zone controllers are not used.

The method utilizes powered booster system equipped with fan in each room to control the flow rate of conditioned air therefore increase the air flow to this room to control the temperature in the room. Although in some cases the previously described central control unit and zone controllers are not used, a central booster controller can be used, which only control the booster and does not control the HVAC unit. The central booster controller can also use wireless (such as radio signals) communication between it and the boosters to control the on/off or speed of the fan in the booster (FIG. 13, 14).

The booster could either be a detachable device that can be placed in front of the exit of the register or directly built into the register. One example of the detachable device is a box shape frame that can cover the exit of the register; the fan/fans and control part are inside the box similar to the device described in U.S. Pat. No. 4,809,593. In some embodiments, the booster is preferably built into a register, which is the piece that covers the exit of a duct into a zone/room. Registers can easily be removed and exchanged without having to tear open the ducts. The advantage of built in register type booster is that it gives less noise, higher air boosting efficacy and better outside looking.

There are many ways to control the operations of the boosters. It can be turned on/off manfully or be to synchronize with the on/off of the existing HVAC system. In one format, it utilize a central control unit and zone controller described above, in another format, a central booster controller senses the on/off of the HVAC device, and then sends out wireless signal to control the on/off or speed of the fan of the boosters. In the third format, each booster has its own sensor (e.g. a temperature sensor or air flow rate sensor) that can sensor the on/off of the HVAC system to turn the fan on or off or adjust the speed of the fan without the need of the central booster controller.

One way is to have a thermostat capable of detecting the room temperature and duct air temperature to regulate the booster. The booster is turned on and off based on whether the HVAC unit is on as well as the relationship between the duct air temperature, the room temperature and the set temperature. For example, if the room temperature meets the set temperature, the booster will be turned off. In another example, assuming that the booster thermostat is set to be 70° F., the room temperature is 80° F., and currently the booster is off; if the HVAC unit is turned on and the air temperature inside the duct is below 80° F., the booster (the fan or fans) will be turned on; the booster will remains off if the duct air temperature is equal to or above 80° F. even when the HVAC unit is turned on. The booster thermostat can be placed either on the booster or in a separately location controlling the booster remotely. In another example, the booster can be set either in heating or cooling state. When it is in cooling state, if it senses cool air coming from the duct (air temperature in the duct lower than the room temperature), it will turn on the booster. If no cool air coming, it will turn off. When it is in heating state, if it sensor hot air coming from the duct (air temperature in the duct higher than the room temperature), it will turn on the booster; otherwise it turn off the booster.

If central booster controller is utilized, there are several methods for the sensor of the central booster controller to sense the on/off of the HVAC unit. These methods can be used independently or in combination with each other. One example is that the sensor device could be a small unit attached on the heating/cooling/ventilation part of the HVAC unite or nearby. It senses the vibration or noise caused by the running of the HVAC unit to determine if the HVAC is on or off. It then sends out wireless signal to turn on or off the boosters in all the zones/rooms accordingly. Another example is that it could be a device attached to an open duct of the HVAC system or be placed inside the duct. Once it senses the air flow from the duct, it starts the remote boosters via wireless communication. In the third example, the sensor device is connected to the existed thermostat via wires. It therefore is able to detect the control signal of the thermostat for the HVAC unit, and thus controls the boosters based on the signal from the thermostat. If the thermostat sends a signal to the HVAC unit to turn it on, the sensor will pick up this signal and the central booster controller will send out signal to start the booster. In the fourth example, the sensor detect the difference between the room temperature and air temperature from the HVAC device and therefore to control the booster. The booster can also be turn on and off based on the relationship between the air temperature from the HVAC device, the room temperature and the set temperature. In one example, when the booster is off, if the sensor in the booster or the central booster controller senses the temperature change in the duct, the booster will be turned on, when the temperature change again, it will be turned off. When using temperature difference described above or airflow in the duct to control the booster's on/off, one can also equip each booster with its own independent temperature sensors/air flow sensor to control its own on/off, therefore in this case, central booster controller and wireless communication may not be needed.

Varieties of controls can also be incorporated into the booster system. Such as fan speed control and temperature control to make people feel more comfortable. The control unit could be either placed on the booster or placed separately to control the booster remotely.

Battery can be used as the power of the central booster controller for easy installation. Preferably the booster employs safe low voltage power. For example, a voltage or power adapter/transformer can be employed to transform/convert dangerous high voltage AC power to the needed safe low voltage DC power. An example of a booster system contains the register frame, the motor driven fan(s) built into the register, the power source and if needed, the sensor or wireless communication unit receiving instructions from the central booster controller or the central control unit. The wireless communication unit could be built either inside the register or outside the register such as integrated with the power adapter. The booster and/or central booster controller can use wireless power system as their power supply such as Nikola Tesla's long-range wireless energy; directional energy transfer such as lasers; induction-based energy transfer systems, and those described in www.witricity.com and etc. The combination of battery and wireless power can also be used. For example, they use rechargeable battery to provide power and when the battery is running low, a remote wireless power supply will charge the battery through a wireless power receiver in the register or control unit (e.g. they will send out a battery low wireless signal to start the wireless power supply for charging).

When central booster controller is used, one example of using this method is illustrated below in details: A system (FIG. 13) is to be installed in an existing home to enable a single zoned AC system regulating airflow rate in different room. The central booster controller comprises a power line or battery powered sensor, which use a vibration (or sound) sensor such as a microphone to pick up the noise of the running of the cooling/heating/ventilation unit of the HVAC system. Once the HVAC system is running, the central booster controller sends out wireless signal to all the remote booster system (FIG. 14) in the installed rooms. The wireless communication unit in the booster system receives the signal and turn on the fan of the booster. Once the HVAC stops, the central booster controller senses the absence of the noise and sends out wireless signals to shut down the fan(s) of the booster system.

However, the easiest way is to use the powered boosters without any sensors or central booster controller. The booster is turned on or off manually by the user. Without any user operation, it is always on or off. This feature is especially useful for the upper level rooms in the summer since it sucks up the cold air from the ducts. A fan speed control can also be added to the booster to adjust the flow rate (e.g., by adjusting the voltage output of the voltage or power adapter/transformer if it is employed).

Alternatively, a sensor (e.g. a temperature sensor or airflow sensor) can be connected to or built within each booster directly to control it's on/off without the need of wireless communication. If airflow sensor is used, in order to distinguish the airflow caused by the HVAC system and the booster itself, the following strategy can be used: the fan of the booster will automatically shut off every small time interval (e.g. one minute), if the air flow rate sensor the air flow even when the fan is off, it will start the fan. An example of the airflow rate sensor, which is placed inside the register, is described in FIGS. 15a and 15b and FIGS. 16a and 16b.

As shown on FIGS. 15a and 15b, a pair of temperature sensor resistors (R1 and R2) with resistance 100 Ω at 25° C. and 400 Ω at 80° C., and a pair of regular resistors, (R3 and R4) with resistance 10Ω, are used. A bridge circuitry is consisted of these 4 resistors. In the structure of the vent register and sensor, R1 is placed in a no air flow chamber and R2 is placed on the vent wind channel, as shown FIG. 15b. With a 12 V voltage applied on the bridge, output voltages Vn and Vw are measured by a microprocessor. When with AC is off, the 12V voltage will heat the R1 and R2 to about 80° C. The resistance will be about 400Ω. The output voltage Vn and Vw would be very close. When the main central fan of AC is on, with the airflow cooling the R2, the temperature of the resistor would decrease to about 40° C. in summer and 30° C. in winter, so that it will reduce the resistance of R2 significantly. The output voltage of Vw will be increased. Algorithms will be embedded on a microprocessor to determine the AC on/off by measuring the change of Vw by reference of Vn, such as if the resistance of R1 and R2 is high, means no airflow from the duct, and if the resistance of R1 is high and resistance of R2 is low, means there is airflow from the duct and the main fan is on. Additional algorithms can be used to avoid the interference by the airflow of the vent fan, such as to stop the vent fan for a short time to differentiating airflow by main fan or vent fan.

In some embodiments, a regular resistor can be used as the heating resistor and be attached to the temperature sensor resistor to heat it; and the temperature sensor resistors are only used for sensing purpose instead of providing heating as well.

A temperature sensor can be used in the booster. It can sense the change of the temperature in the duct. When the booster is in on state, if it senses a significant change of temperature of the air around it, it will stop the booster. When the booster is in off state, if it senses a significant change of temperature of the air around it, it will start the booster. It can also be used as an additional sensor collaborating with the wind sensor to determine the status of the AC and therefore turn on or off the booster. For example, if both the temperature sensor and wind sensor sense the AC is not working, the booster will be stopped.

In another example, a temperature detecting circuit can be used as FIGS. 16a and 16b. Resistance of R6 is high enough to not allow the R5 to have significant heating up. So, the temperature change can be measured by Vt. Vt can also be used by the algorithms, as an additional parameter, to determine the status of the main AC unit.

A temperature control and a damper can also be integrated with the booster. The damper can either open or close to allow or block/reduce the airflow from the duct. The damper can be build either in front of the fan or behind the fan as long as they block/reduce the airflow if closed. The damper can be either manually operated of powered. One of the reasons to use damper in the booster system is for example, HVAC is set to cooling state, sometimes the HVAC is on but the room having booster is already cold enough; simply turning off the fan cannot stop the cold air coming out from the duct. Therefore a temperature control can be added to the booster system, which set the desired temperature. If the desired temperature is meet (e.g. the room temperature is lower than the set temperature in the summer or the room temperature is higher than the set temperature in the winter, a winter/summer selection control can be added), it will close the damper therefore block any more cold air coming out from the duct. Another method is to not use damper but reverse the rotation direction of the fan therefore the fan will try to blow air into the duct to reduce the airflow coming out from the duct.

Furthermore, air purification device can be integrated with or attached to the register or the booster. For example, it can be built within the register; it can also be a tower type structure that covers the vent of the booster. An air purification unit is inside the tower. When the air coming from the booster pass though the air purification unit the air will be purified and then comes out of the tower to go into the room. Examples of the air purification units, including static electricity filters, electrostatic precipitating cleaners, electret filters, ozone generators, UV generators, and negative ion generators or combinations thereof, which clean and sanitize the air by collecting dust, killing airborne molds and bacteria, or otherwise reducing the level of airborne pollutants. For example it could be a pair of plate emitters electrically connected to a high voltage generator. As is known in the art, ozone is generated in emitters via a high voltage applied across spaced electrodes or conductive plates. In another example the air purification unit includes a light source, which is surrounded by a cylindrical shell of photo catalytic material (such as a titanium oxide coated substrate). Contaminates in air passing through it are catalytically oxidized with the energy supplied by light.

FIG. 17 illustrates a filter tower as the air purification device, which is detachablely fixed to a booster (e.g. the tower and the booster can be snapped together). The tower has an electrostatic precipitating cleaner unit inside for air purification. The power supply can either be from the booster or from its own power line or share the adapter with the booster.

The invention described in above summary is further explained with the following drawings that illustrate specific embodiments of the invention.

BRIEF DESCRIPTIONS OF DRAWS

The invention described in above summary is further explained with the following drawings that illustrate specific embodiments of the invention.

FIG. 15a, 15b shows an embodiment of temperature detecting circuit and the temperature sensor.

FIG. 16a, 16b shows an embodiment of temperature detecting circuit and the temperature sensor.

DETAILED DESCRIPTION

The following detailed description is provided as an aid to those desiring to practice the invention disclosed herein, it is not, however, to be construed as limiting to the instant invention as claimed, since those of ordinary skill in the art will readily understand that variations can be made in the examples, procedures, methods and devices disclosed herein, without departing from the spirit or scope of the instant invention.

Figure 1:
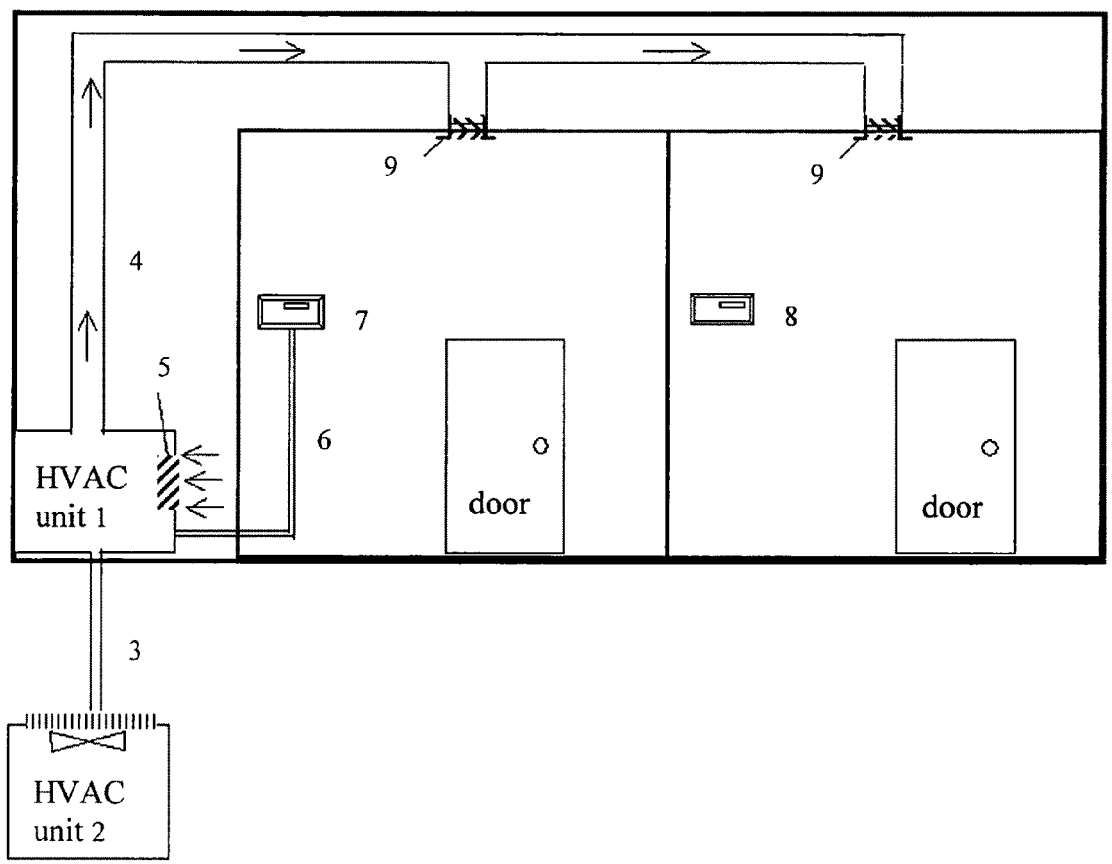
FIG. 1 shows schematically an overall concept of the invention using central controller and zone controller embodied herein.

FIG. 1 is an embodiment of multi-zone HVAC system. It shows schematically the overall concept of the invention embodied herein. A HVAC unit 1 (the indoor part of the HVAC) supplies conditioned air to two rooms through duct 4. The outdoor part HVAC unit 2 connects with the indoor HVAC unit 1 though pipe 3 (e.g. the heat exchange unit). Air circulates in the room through duct 4 and HVAC air intake 5. A central controller 7 is a combination of a zone controller and a central control unit. As a zone controller, it controls register (air flow rate regulating device) 9 and detect the conditions of the room (e.g. temperature and/or the status of the register) and send it to the central control unit part of itself. As a central control unit, it coordinates with the zone controllers 8 and controls the HVAC unit through wire 6. The conditioned air exits into the rooms through registers 9, which is shown in greater detail in FIG. 2.

Figure 2:
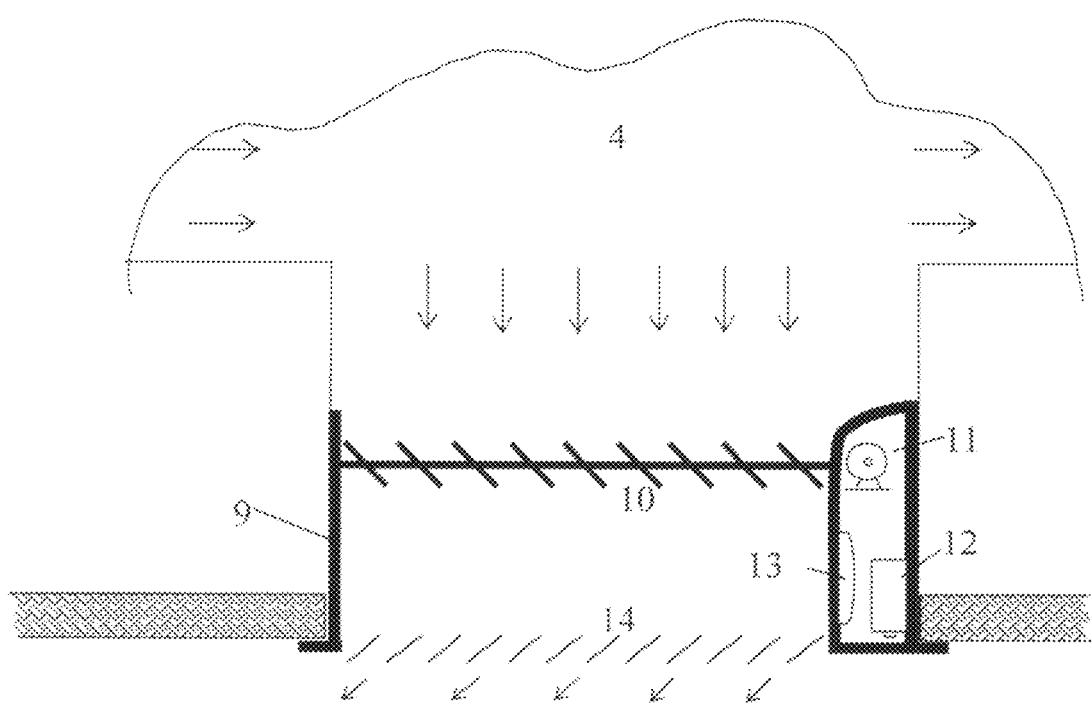
FIG. 2 shows an embodiment of a wireless adjustable register using battery-powered damper.

FIG. 2 shows an embodiment of a wireless adjustable register using battery-powered damper. In FIG. 2, register 9 consists of a built-in damper 10, a motor 11, one or more batteries 12, a wireless radio receiver and transmitter 13 and a screen 14; it could also contain build in fan or fans as a booster or contain both damper and booster. The battery powers the motor to open or close the damper.

Figure 3:
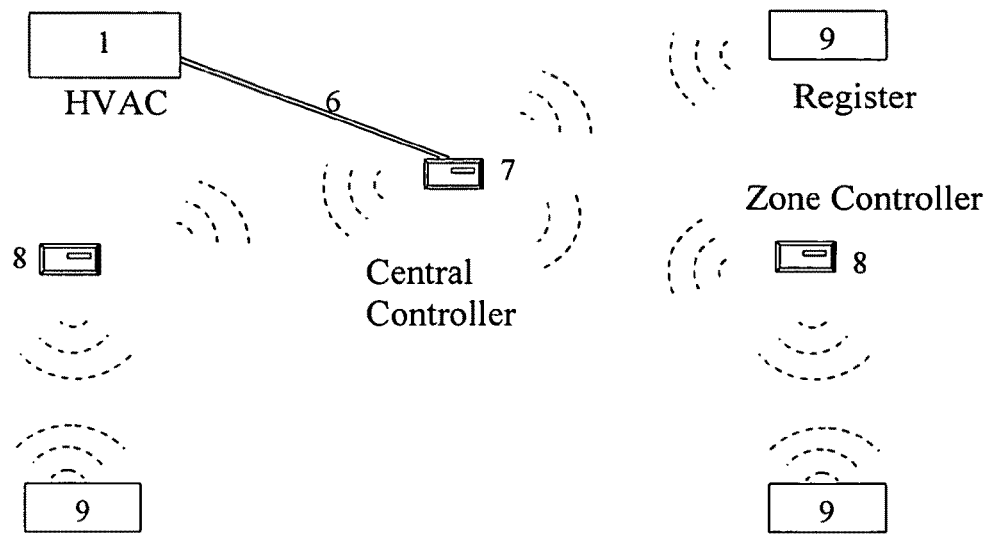
FIG. 3 shows an embodiment of the intelligent digital wireless communication network.

FIG. 3 shows the digital wireless network that connects the central controller 7, the zone controllers 8, and the registers 9. Central controller 7 controls and communicates with the HVAC unit through wire 6. Each component in the wireless network has a unique network ID and a zone controller is programmed to communicate only with register(s) 9 inside this zone and the central controller 7. The whole system could also be incorporated into a local network such as LAN, a home network, therefore could work with additional computer systems. In some embodiments, the central controller can also be connected with HVAC unit via a wireless connection and control it wirelessly and the HVAC unit has a wireless receiver.

Figure 4:
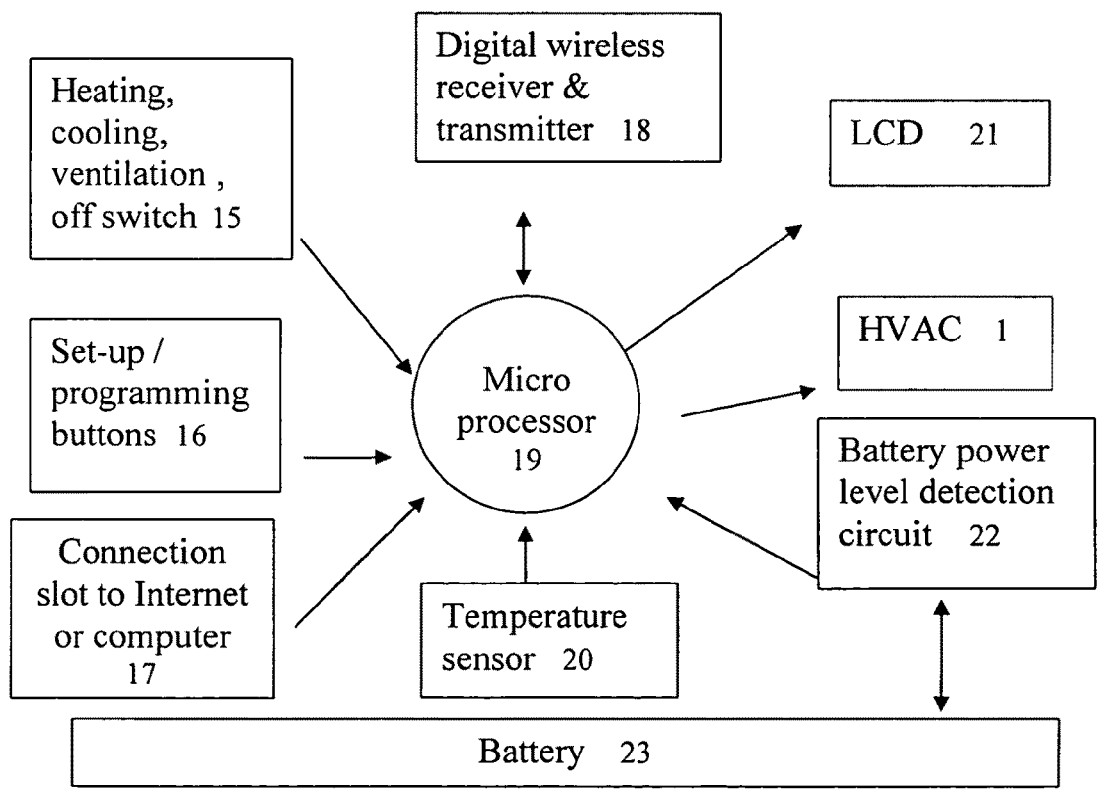
FIG. 4 is a block diagram for an embodiment for the central control unit.

FIG. 4 is a block diagram of one embodiment of the central controller that also functions as a zone controller for the zone it is located. Switch 15 sets the mode of the central controller to be either heating, or cooling or ventilating or off. Buttons 16 on the controller are used to program desired zone temperatures and can be used to enter simple instructions to Microprocessor 19, which can have built-in control logic as well. Slot 17 is a connection to Internet or a personal computer. For example, it can be a USB slot or a wireless communication port. The digital wireless receiver and transmitter 18 communicate with its zone registers and other zone controllers. A temperature sensor 20 senses and reports the ambient temperature to the microprocessor 19. Battery 23 supplies power to all components of the central controller. LCD 21 displays information including: a) the set temperature, b) the ambient temperature, c) sign for low battery power for zone controller, d) sign for low battery power for the register(s), e) if manual override is engaged in the register(s) and f) the current status of the HVAC. To reduce power consumption on the register battery, microprocessor 19 is responsible to check on the power level of the register battery, instead of the register reporting its own power level. Each zone controller reports the status in its zone to the central controller. When desired condition (e.g. set temperature is reached) in all zones are achieved, the heating/cooling of the HVAC unit is turned off by the central controller. If one or more zones' setting are not reached, the central controller will keep the heating/cooling of the HVAC unit on to produce cooling or heating depend on the switch selection (e.g. if it is in summer, the switch should be set at cooling so the central controller will instruct the HVAC unit to produce cooling). A more complicated algorithm can be used by the central controller for determining if it should keep the HVAC unit on or off. For example, the zone can be grouped by priority, if most high priority zone (e.g. bed room at night, living room during day light) reached their setting, the central controller will stop the HVAC unit although some low priority zone's need (e.g. living room at night) are not meet.

Figure 5:
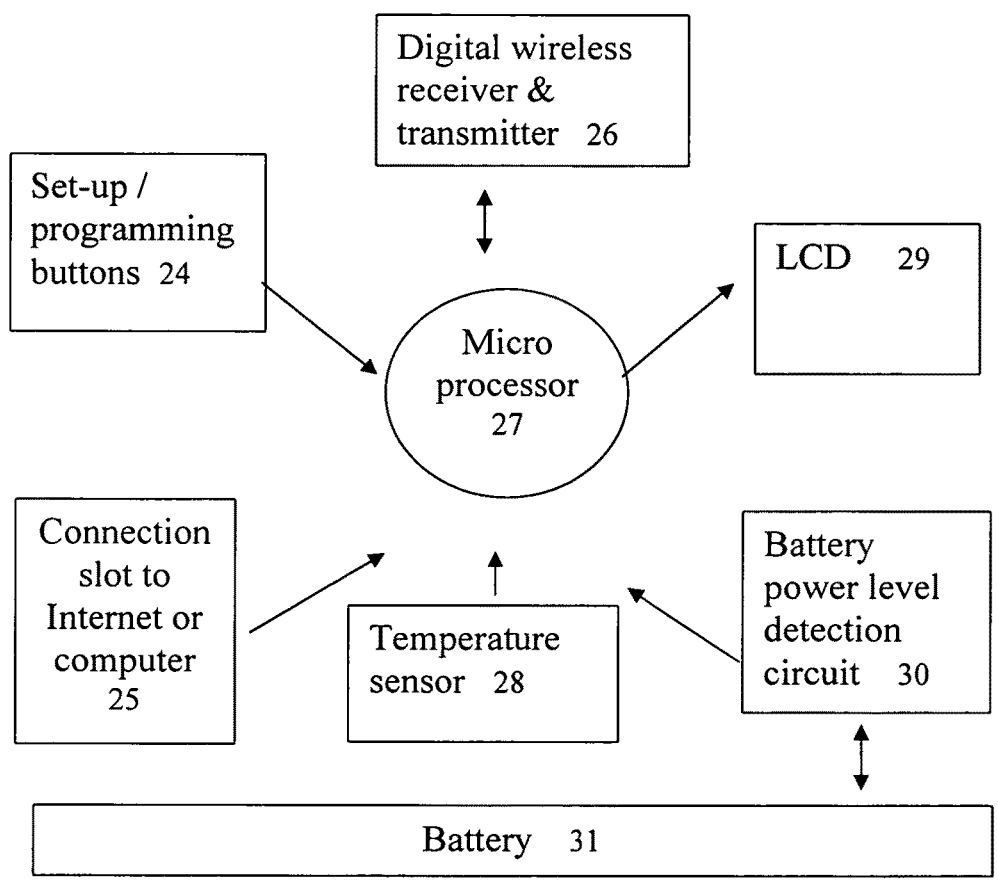
FIG. 5 is a block diagram for an embodiment for the zone control unit.

FIG. 5 is a block diagram for an embodiment for the zone control unit. Compared to the central controller depicted in FIG. 4, the zone controller does not directly control the HVAC and does not set the HVAC state (heating, cooling, ventilation, off).

Figure 6:
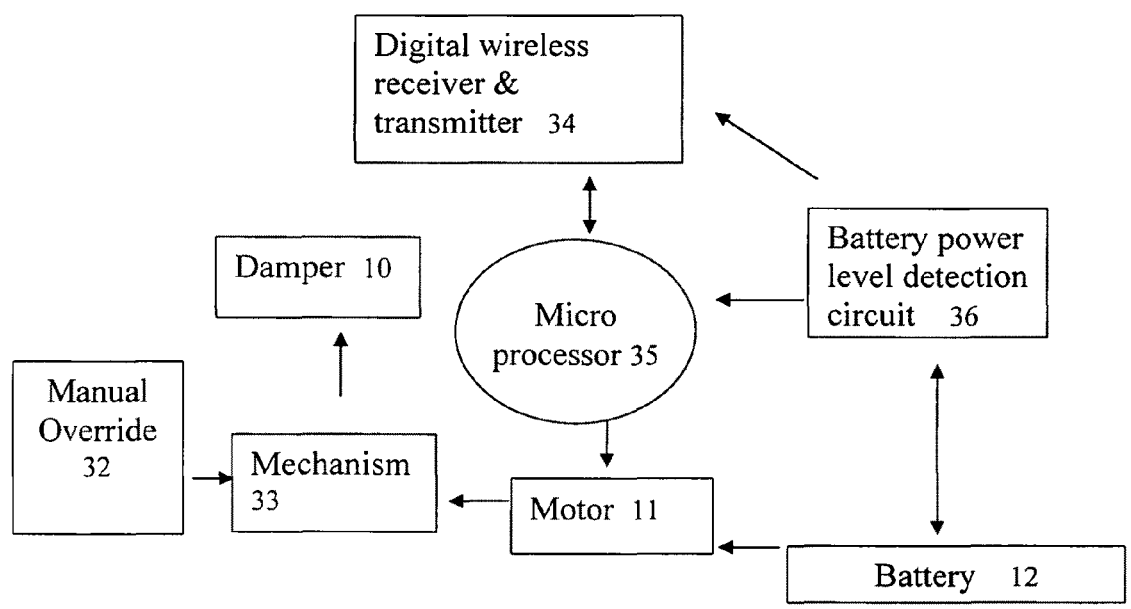
FIG. 6 is a block diagram that shows an example of the components on a register and their relationship.

FIG. 6 is a block diagram that shows an example of the components in a damper type register. Circuit 35 processes the instructions received from zone controller through wireless transmitter 34 and instructs motor 11 to drive mechanism 33 to adjust damper status accordingly to status between completely open and completely close. A manual override is built-in to override instructions from zone controller. When manual override is engaged, instruction from zone controller is ignored. Information sent to the zone controller wirelessly includes the damper status, battery level and if manual override is engaged.

Table 1 tabulates an example for the algorithm a zone controller or central controller employs to control the register status. The symbol Δ represents the temperature dead band, which is the preset tolerance range on temperature before damper/booster status is changed. The tolerance range for different zones can be set to different values. For example, if there is a zone that is more demanding than other zones in the sense that it is usually the last to reach the set temperature and the first to activate the HVAC unit, the tolerance range Δ for this zone could be set the largest to avoid frequent turning on and off of the HVAC unit. The central controller can also use the tolerance range of each zone to control the on/off of the HVAC unit. For example, in summer and the set temperature is 70° F. and the actual room temperature of zone 1 is 71° F. and its tolerance range Δ is 2° F. and all other zones are satisfied, the HVAC will not be turned on by central controller to produce cooling until the actual room temperature of zone 1 is 72° F.; it will not stop cooling until the actual room temperature of zone 1 is 68° F.

TABLE 1

| Damper status control logic for two-position damper | | | |
|---|---|---|---|
| HVAC state\Temp. Setting | Set > actual + Δ | Set < actual − Δ | Otherwise |
| Heating | Open | Close | No Action |
| Cooling | Close | Open | No Action |
| Ventilation | Open | Open | Open |

Figure 7:
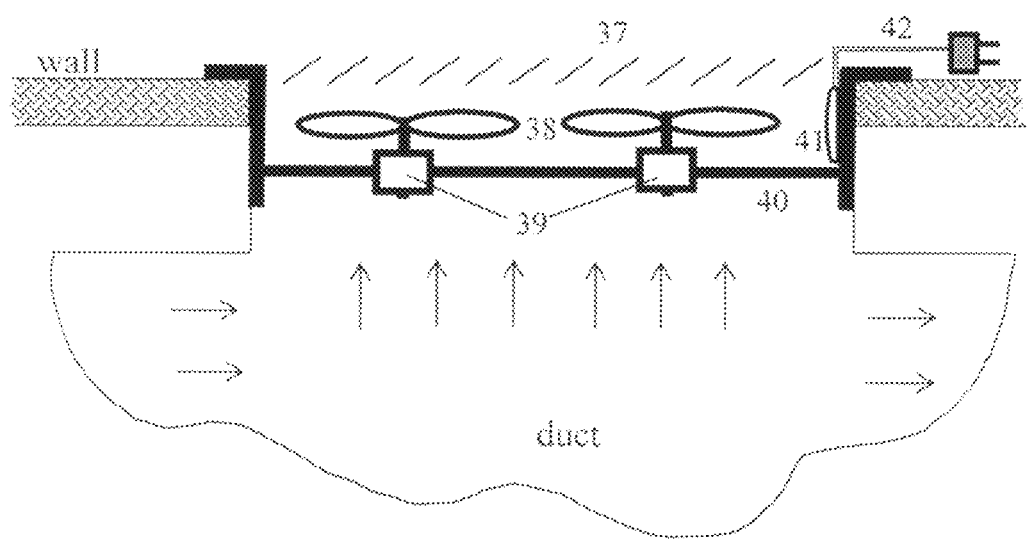
FIG. 7 shows another embodiment of the register with an airflow booster.

FIG. 7 shows the side section view of another preferred embodiment of the register with an airflow booster. The booster can be a powered adjustable register depicted in FIG. 2 with one or more fans 38 added. The powered damper part may not necessarily be included. A wireless signal transceiver 41 communicates with the zone controller and sends control signal to motor 39, which controls fan 38 through certain mechanism. Fan 39 is mounted on the walls of the booster through thin metal rods 40. Screen 37 protects the fan and diffuse airflow. Power is brought to the booster through electrical wire 42. Since the booster fans themselves can serve as dampers when not operating or reverse the rotating direction to blow air back to the duct, a blade damper may or may not be needed.

Some HVAC unit operates most efficiently in certain airflow/air pressure range. Too little airflow may cause overheating or icing. There are many means to prevent this from happening, some of which are listed below:

1. always keep certain percentage, e.g. 20-30%, of registers open. Usually, there are enough registers in closets and bathrooms to meet this needs and these registers may not need to be the powered registers;
2. use booster registers in selected locations to boost airflow. In general, the boosters can be used in zones where the temperature conditions are more difficult to satisfy;
3. register dampers can be designed such that a certain percentage of airflow is allowed even in a close position.
4. the HVAC is not allowed to remain on for prolonged period if less than a certain percentage of register is open. This may result in the set temperature in certain zone not being satisfied in one heating or cooling cycle. If the set temperature cannot be satisfied in multiple cycles, a register booster is recommended.
5. temperature sensors can be installed near the air-handler to detect icing or overheating. The heating/cooling will be shut down if the temperature rise above or drop below a set level or open more dumpers or start more boosters to increase the airflow passing the heating/cooling unit. Pressure sensor can also be installed, if the air pressure in the HVAC system is too high, the control unit will open more dumpers or start more boosters to release the pressure or shut off the HVAC system. Air flow bypass can also be installed as previously described.
6. width of the dead band for a zone can be set manually or automatic according to the speed of the temperature fluctuation in that zone. In general, the faster the temperature fluctuates, the wider the dead band.

7. The heating/cooling capacity is decreased to compensate the overcooling/heating; or the power of the central will increase therefore maintain enough airflow in the duct.

In practice, a combination of the above measures can be used. For example, a simple means would be to keep 20% of registers always open and use boosters in 20% of the remaining registers. Sometimes for some reason a certain room's setting is difficult to reach (e.g. the temperature setting for certain room is too low when cooling or too high when heating), this room will keep the HVAC unit active for a period of time even after all other room's needs are satisfied. A warning message can be displayed on the zone controller and/or the central controller to remind the user to adjust the setting in that particular room. In some embodiments, these rules/algorithms are stored and used by the central controller.

Figure 8:
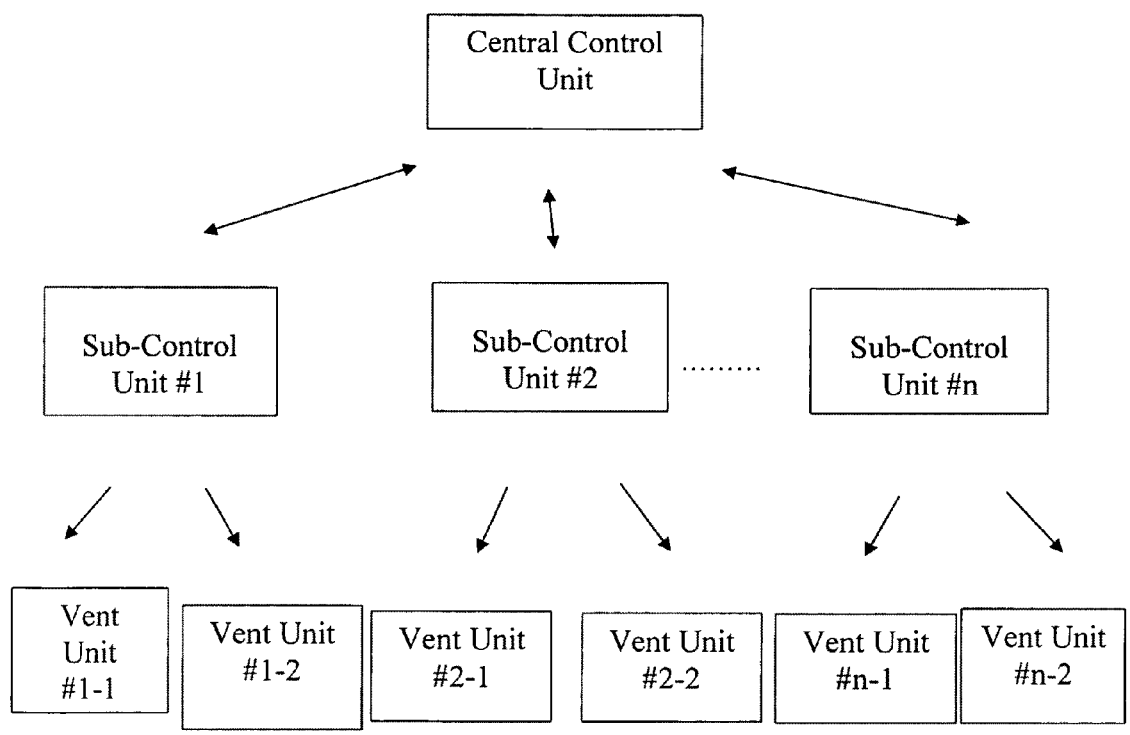
FIG. 8 depicts an embodiment of the 3-layer structure of the intelligent digital wireless communication network.

Wireless communication system is needed to transmit information between the central (main) control unit, sub (zone) control units and airflow rate regulating devices (vent units such as registers). A digital wireless communication system is designed to have very low manufacturing cost, reliable communication at relatively low data rate. A design example is illustrated as the following:

FIG. 8 depicts an embodiment of the 3-layer structure of the intelligent digital wireless communication network. The central unit (central controller) is on the top, the sub units (zone controller) are in the middle and the vent units (airflow rate regulating device) are on the bottom. The central unit does not control and communicate with the vent unit directly. The operation of the vent unit is directly controlled by the zone controller. However in another embodiment the central controller can also communicate with and control the vent unit to implement certain operations and algorithm. The vent unit may also send signal back to the zone controller (e.g. reporting its status) and/or central controller.

Yet in another embodiment, the central controller directly controls the vent units and the zone controller only report the zone status to the central controller. The zone controller does not control and send command to the vent unit therefore the corresponding part in zone controller will not be necessary. However because the temperature setting is still performed in zone controller, it is still called zone controller.

Yet in the third embodiment, the central controller directly controls the airflow rate regulating device and the zone controller is integrated with the airflow rate regulating device.

Figure 9:
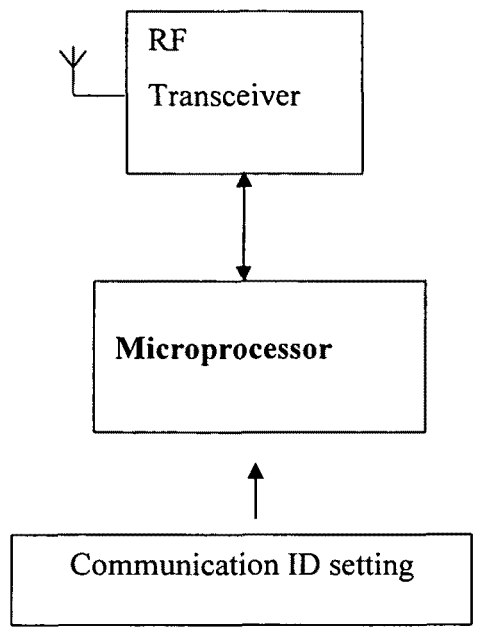
FIG. 9 is an embodiment of the structure of a control unit (central or zone control unit) of the wireless communication system.

FIG. 9 is an embodiment of the structure of a control unit (central or zone control unit) of the wireless communication system. A transceiver is sending or receiving RF (radio frequency) signal or other wireless signal such as infrared signal. The microprocessor is to act as encoder or decoder during signal transmitting or receiving mode. A unique ID/address is assigned to each central control unit during manufacturing, and the IDs of zone control units will be preset or set during installation to correspond to the ID of the central control unit.

Figure 10:
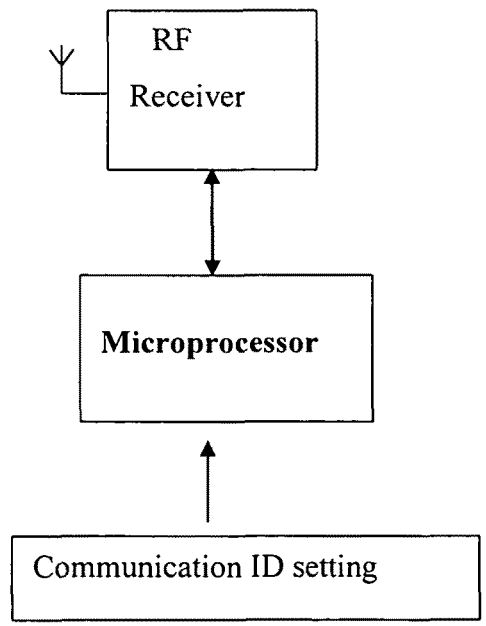
FIG. 10 is an embodiment of the circuit structure of an airflow rate regulating device.

FIG. 10 is an embodiment of the circuit structure of a vent unit (airflow rate regulating device). In the simplest case, it only contains a receiver in the RF part. If sending data to other control unit is desired, a transceiver will be used instead of the receiver.

Figure 11:
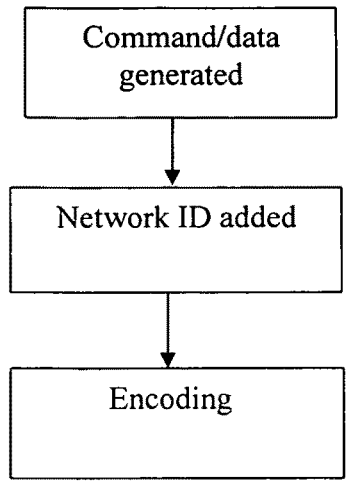
FIG. 11 is an embodiment of the command/data transmitting process flow chart.

FIG. 11 is an embodiment of the command/data transmitting process flow chart. During transmitting mode, the microprocessor encodes signal with the command/data and the network ID of the unit it intends to send signal to and enable the RF transmitter to transmit radio signal.

Figure 12:
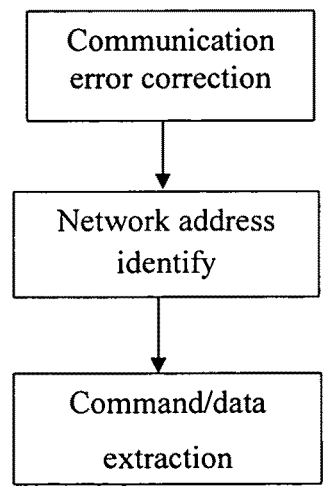
FIG. 12 is an embodiment of command/data receiving process flow chart.
Figure 13:
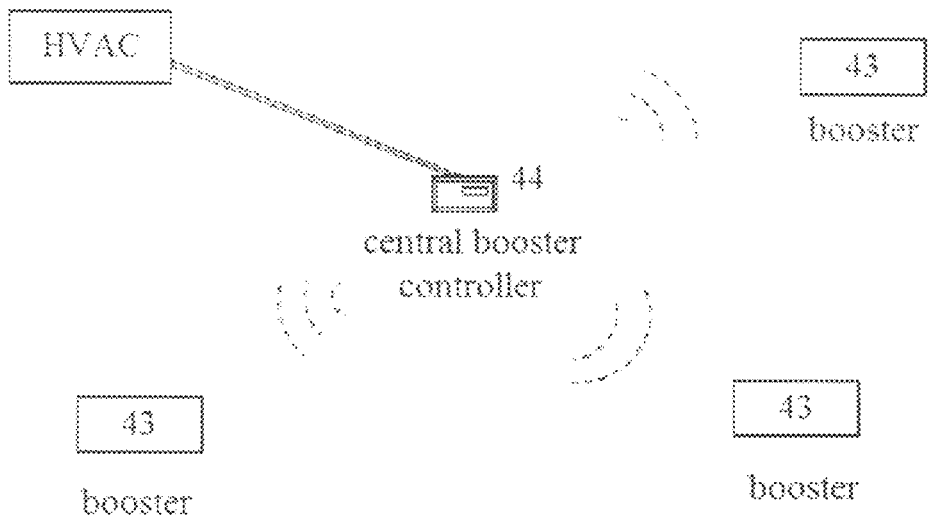
FIG. 13 shows an embodiment of boosters using central booster controller.
Figure 14:
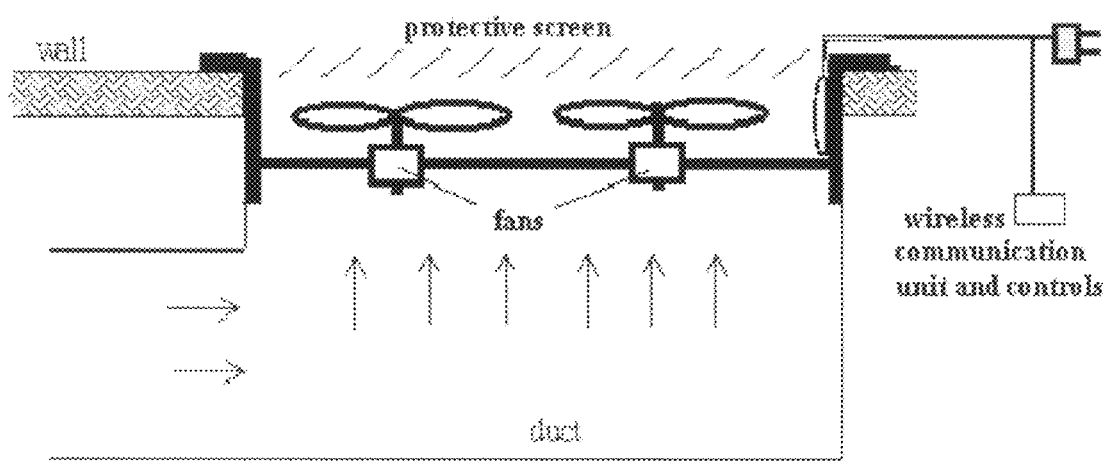
FIG. 14 shows schematically a remotely controlled booster.
Figure 17:
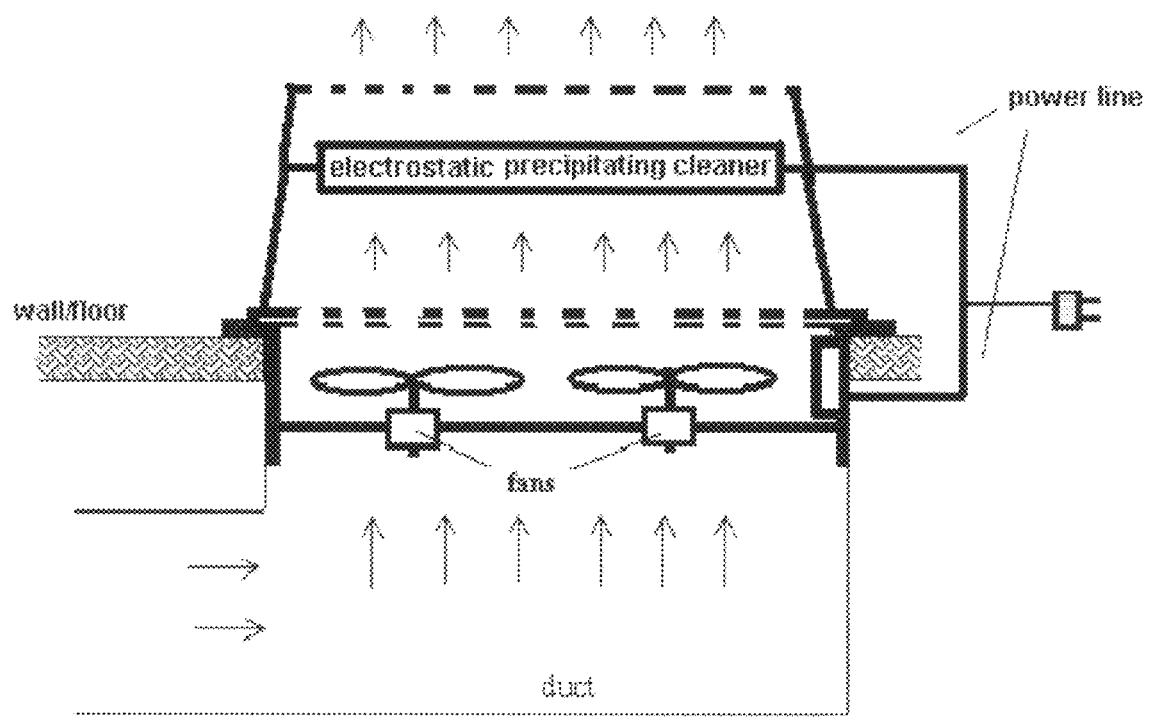
FIG. 17 shows an embodiment of a booster with a air purification system.

FIG. 12 is an embodiment of command/data receiving process flow chart. During receiving mode, the microprocessor decodes signal received by the receiver, processes to accept or reject according the network ID and extracts command/data.

In some embodiment, a simplified version can be used in which the zone controller is integrated with the register or connected with register with wire therefore eliminate the use of corresponding parts for wireless communication between the zone controller and the register.

Since only the zone controller need to have the RF module, the cost can therefore be reduced. In fact it is similar to a register having a thermostat that can wirelessly communicate with the central controller. If more than one register is used in a zone and the zone controller is connected with only one register with wire, the other registers in this zone can be made to receive wireless communicate from this register/zone controller in order to be to be turned on or off.

As previously described, normally the upper floor is much hotter than lower floor in the summer and much cooler than other floors in the winter if only one single zone HVAC is used; and most single zone HVAC only use one central fan to deliver the air to each room. A simplified method to overcome this problem is to install a second fan that can enhance the floor rate in the main duct sending air to the upper floor therefore providing more conditioned air to the upper floor. This second fan is installed in the duct connecting to the upper floor only, not in the duct also sending air to the lower floor. In some embodiments, the on/off or speed of this fan can be controlled by a remote controller in the upper floor. The remote controller can control the fan with the user's manual input or with certain logic stored in the remote controller. For example, if the remote controller sense the heating/cooling unit of the HVAC is on and the preset temperature in the zone in the upper floor is not met, it will turn on the second fan or speed up the second fan. If the preset condition is met, it will turn off the second fan. In other embodiments, the second fan can be automatically turned on or off with the on/off of the HVAC system using the same methods described previously for the register booster. In some cases, certain rooms not necessarily in the upper floor also have low efficiency cooling/heating or high cooling/heating demand. These rooms can be treated similarly to the upper floor rooms described above by install a similar fan in the duct connecting to these rooms only and the similar control mechanism accordingly.

What is claimed is:

1. A multiple zone climate control system, comprising:
   a. an HVAC unit that supplies conditioned air to more than one zone, wherein the HVAC unit contains a heating unit or a cooling unit or a combination thereof;
   b. a zone controller in each zone requiring climate control;
   c. a central controller, said central controller controlling said HVAC unit to be in a state selected from heating, cooling, ventilating, and off, wherein the central controller is configured to turn off the heating or the cooling unit after all zones or after selected zones reach their preset conditions respectively and to turn on the heating or the cooling unit after a predefined number of zones' preset conditions are not met;
   d. one or more air flow rate regulating devices in each zone requiring climate control, wherein each of said one or more air flow rate regulating devices is powered and is built into a register or placed on top of the register, each of said one or more air flow rate regulating device further comprising one or more dampers or boosters or combinations thereof and an air flow rate regulating device controller, said air flow rate regulating device controller being configured to communicate with a corresponding zone controller or with said central controller to adjust the degree of openness of said one or more dampers accordingly or to adjust the performance of said boosters accordingly to reach a desired climate control which is set at the zone controller in each zone; and, e. a digital wireless network that connects said central controller, said zone controllers and said one or more air flow rate regulating devices, wherein said zone controllers are configured to communicate with the central controller through said digital wireless network.

2. The multiple zone climate system in claim 1, wherein said zone controllers communicate with the central controller and with the one or more air flow rate regulating devices.

3. The multiple zone climate control system in claim 1, wherein a central fan in said HVAC unit is adjustable to compensate for closing of said dampers.

4. The multiple zone climate control system in claim 3, wherein the speed of said central fan increases when more of said dampers are closed.

5. The multiple zone climate control system in claim 4, wherein the speed of said central fan is controlled by the central controller.

6. The multiple zone climate control system in claim 1, wherein the capacity of said heating unit or cooling unit is adjustable based on the volume of airflow passing therethrough.

7. The multiple zone climate control system in claim 6, wherein said heating unit produces less heating when less air passes though it or said cooling unit produces less cooling when less air passes through it.

8. The multiple zone climate control system in claim 7, wherein the performance of said heating unit or cooling unit is controlled by the central controller.

9. The multiple zone climate control system in claim 1, wherein said air flow rate regulating device controller is controlled by a zone controller.

10. The multiple zone climate control system in claim 1, wherein said air flow rate regulating device controller is controlled by said central controller.

* * * * *